United States Patent [19]
Tanaka et al.

[11] Patent Number: 4,694,330
[45] Date of Patent: Sep. 15, 1987

[54] COLOR CORRECTION CIRCUIT

[75] Inventors: Yutaka Tanaka, Kanagawa; Shunji Umemura, Chiba, both of Japan

[73] Assignee: Sony Corporation, Tokyo, Japan

[21] Appl. No.: 766,802

[22] Filed: Aug. 19, 1985

[30] Foreign Application Priority Data

Aug. 21, 1984 [JP] Japan .................................. 59-173599
Aug. 28, 1984 [JP] Japan .................................. 59-178835

[51] Int. Cl.⁴ ............................................. H04N 9/68
[52] U.S. Cl. ...................................... 358/27; 358/29; 358/80
[58] Field of Search ................ 358/27, 28, 29, 37, 358/40, 21 R, 80

[56] References Cited

U.S. PATENT DOCUMENTS 4,069,432  1/1978  Bazin .................... 358/27 X
4,261,009  4/1981  Tomimoto et al. ........ 358/27
4,355,326 10/1982  Lee ...................... 358/37
4,356,508 10/1982  Okada .................... 358/29

Primary Examiner—James J. Groody
Assistant Examiner—Victor R. Kostak
Attorney, Agent, or Firm—Hill, Van Santen, Steadman & Simpson

[57] ABSTRACT

A color correction circuit is disclosed, which includes three video signal lines for supplying red, green and blue signals, respectively, a first circuit for detecting a white color component, a circuit for applying the red, green and blue signals to the first detecting circuit, a second circuit for detecting a predetermined color component, a circuit for applying at least two signals of the red, green and blue signals to the second detecting circuit, a circuit for producing a difference signal between output signals of the first and second detecting circuits and a circuit for controlling at least one of the red, green and blue signals according to the difference signal.

8 Claims, 20 Drawing Figures

4,694,330

COLOR CORRECTION CIRCUIT

BACKGROUND OF THE INVENTION

1. Field of the Invention

This invention relates to a color correction circuit for use with a television receiver and so on and which can correct a particular color of an image signal.

2. Description of the Prior Art

In the image processing, the color correction has to be made frequently.

For example, when the image content of a film is converted to a video signal and an aerophotograph is converted to a video signal, it is necessary that a particular color thereof is corrected so as to form a normal color or a particular color is emphasized, and then converted to a video signal.

Further, in a television receiver and so on, sometimes, there is such a case that a particular color of a television picture is corrected to be a desired color.

In case of the television receiver, when a red color, for example, is emphasized more than other colors, of red, green and blue colors that are supplied to the cathodes of a color cathode ray tube, respectively, it is sufficient to make the level of the red signal higher than those of the other signals. Although the primary color signals can be corrected, it is not possible to correct only a particular neutral tint such as skin color. To attain this objective, a level control circuit has to be provided, which can change the levels of red, green and blue signals, respectively. According to this example, although the skin color can be corrected, there still remains a defect in that other colors will be corrected in like manner.

OBJECTS AND SUMMARY OF THE INVENTION

Accordingly, it is an object of this invention to provide a color correction circuit capable of obviating the above prior art defects and which can correct a particular color and which can reduce the bad influences that will be exerted upon other colors by the correction of the particular color.

It is another object of this invention to provide a color correction circuit which can emphasize or modify only a particular color.

It is a further object of this invention to provide a color correction circuit for use with a color television receiver which can correct only a portion of skin color to a desired color.

It is a yet further object of this invention to provide a color correction circuit for use with a color television receiver which can emphasize the blue signal corresponding to a white portion thereby to reproduce a bluish white picture image which has a high color temperature.

According to one aspect of the present invention, there is provided a color correction circuit comprising:

(a) three video signal lines for supplying red, green and blue signals, respectively;

(b) first means for detecting a white color component;

(c) means for applying said red, green and blue signals to said first detecting means;

(d) second means for detecting a predetermined color component;

(e) means for applying at least two signals of said red, green and blue signals to said second detecting means;

(f) means for producing a difference signal between output signals of said first and second detecting means; and (g) means for controlling at least one of said red, green and blue signals according to said difference signal.

The above and other objects, features and advantages of the present invention will become apparent from the following detailed description of illustrative embodiments thereof to be read in conjuction with accompanying drawings, throughout which like references designate the same elements and parts.

DESCRIPTION OF THE PREFERRED EMBODIMENTS

Prior to describing the present invention, an example of a prior art color correction circuit will be described briefly.

When a television picture contains a white color, it is well known that if the white color is made to be a bluish white by raising the color temperature, the white color is seen beautiful in the visual sense.

Figure 1:
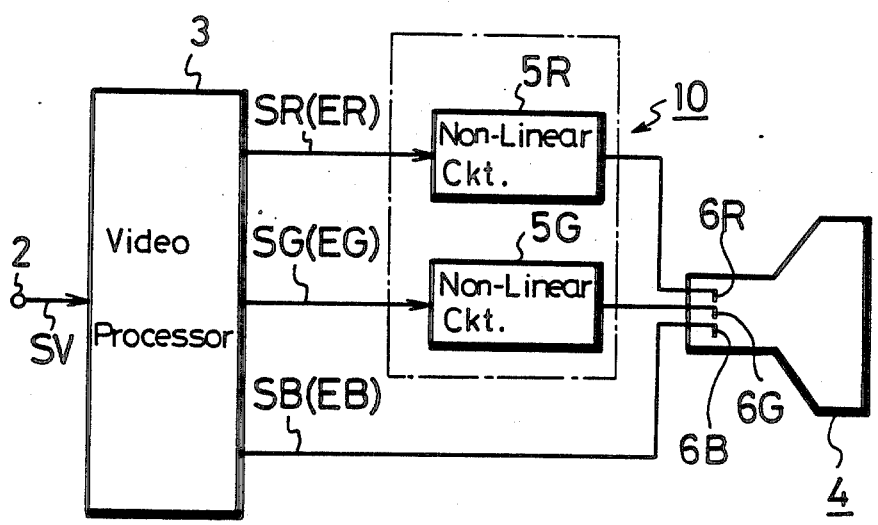
FIG. 1 is a block diagram showing an example of a prior art color correction circuit.

In order that the white color component at the image transmitting side is corrected to be a desired color in the visual sense, a color correction circuit 10 as shown in FIG. 1 is used in the prior art.

Referring to FIG. 1, a television signal SV applied to a terminal 2 is supplied to a video processor 3, in which it is converted to primary color signals SR, SG and SB, respectively. These primary color signals SR, SG and SB (whose levels are ER, EG and EB) are supplied to corresponding cathodes 6R, 6G and 6B of a cathode ray tube (CRT) 4. The color correction circuit 10 is provided for R (red) and G (green) channels to achieve a particular color correction.

The color correction circuit 10 includes non-linear circuits 5R and 5G that are provided in the R and G channels, respectively. The non-linear circuit 5R is arranged such that as shown by a one-dot chain line LR of FIG. 2, from input level higher than a level La near the white level, the input and output characteristic thereof becomes non-linear. While, the other non-linear circuit 5G is also arranged such that as shown by a broken line LG in FIG. 2, from the input level higher than the level La, the input and output characteristic thereof becomes non-linear.

Accordingly, for the input level higher than the level La, while the respective levels of the R and G channels are suppressed, the level of the B channel is produced as it is. Therefore, the primary color signals SR, SG and SB are supplied to the CRT 4 under the state that the blue signal SB is emphasized as compared with the red and green signals SR and SG. As a result, the color temperature becomes high and hence the picture is reproduced with a bluish white color. Thus, the white color is seen to be beautiful in the visual sense.

Figure 2:
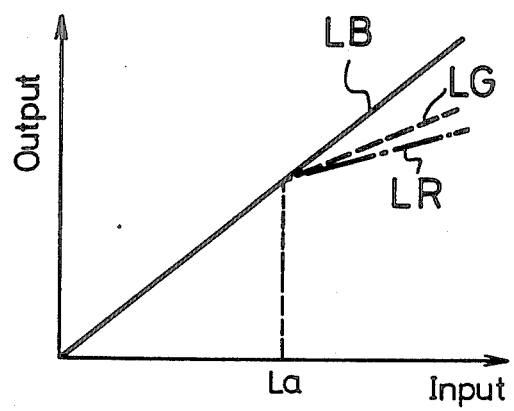
FIG. 2 is a characteristic graph useful for explaining the prior art color correction circuit of FIG. 1.

Although the prior art color correction circuit 10 thus arranged can correct the color such that the white color is seen to be beautiful in the visual sense, other colors other than the white color are corrected in accordance with the characteristics of FIG. 2, resulting in the following problems.

That is, the level La is set at a relatively low level even for the white level. On the other hand, even in case of skin color, if its level is relatively high, skin color has a level near the level La. Therefore, if a skin color signal having such high level is supplied to the color correction circuit 10, the blue signal is emphasized, too. Hence, the skin color becomes bluish and such color correction is not desirable.

Therefore, it may be considered to set the level La high to prevent the skin color from becoming bluish. If the level La is set at a high level as described above, colors other than white having a high level can not be corrected, so this can not solve the afore-mentioned problems effectively.

Now, the present invention will hereinafter be described with reference to the following drawings.

Figure 3:
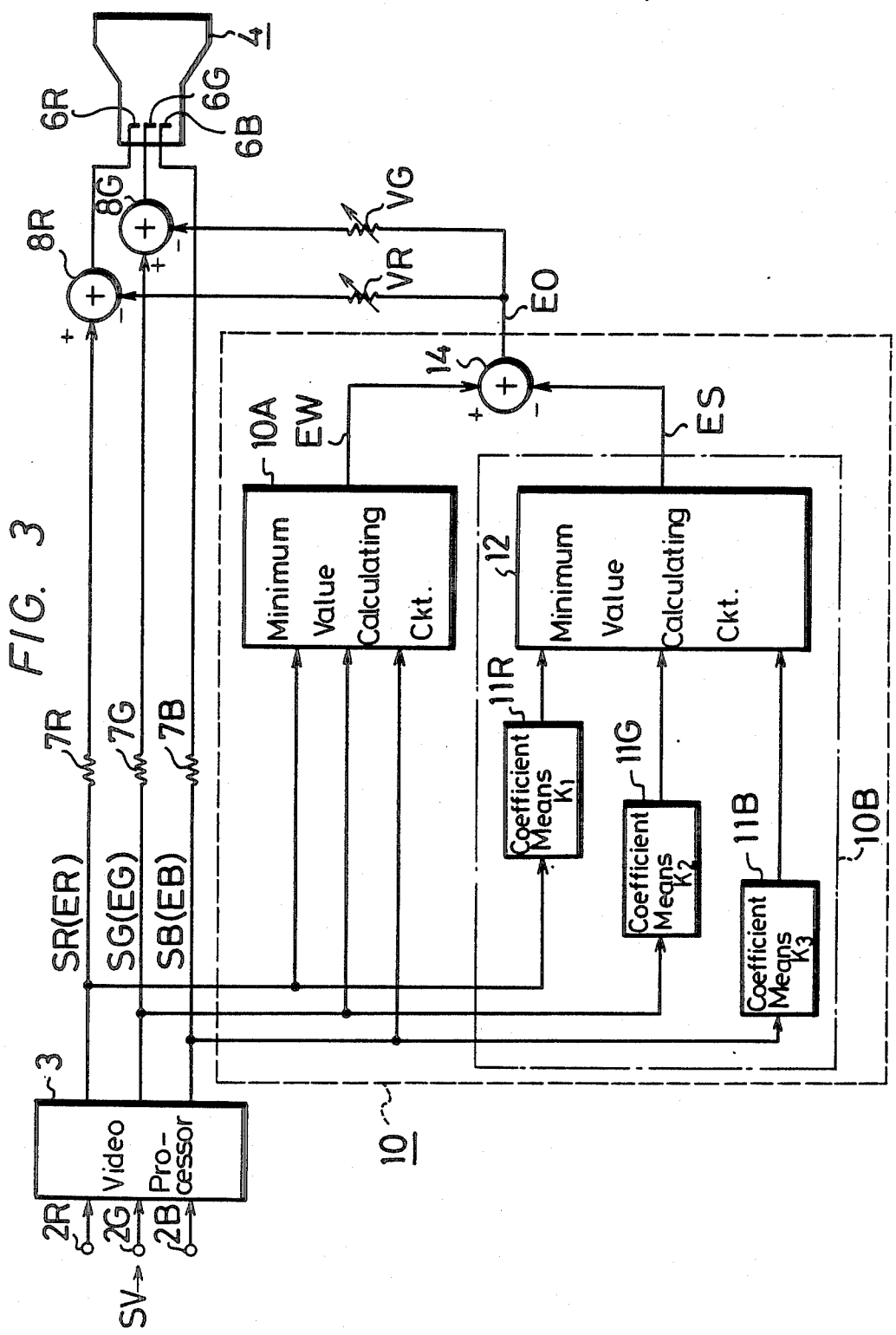
FIG. 3 is a block diagram showing a first embodiment of a color correction circuit according to this invention.

FIG. 3 is a block diagram showing a first embodiment of the color correction circuit 10 according to this invention. In FIG. 3, like parts corresponding to those of FIG. 1 are marked with the same references and will not be described.

Referring to FIG. 3, the television signal SV applied to terminals 2R, 2G and 2B are all supplied to the video processor 3, in which it is converted to the red, green and blue signals SR, SG and SB, respectively. Also these red, green and blue signals SR, SG and SB are supplied through resistors 7R, 7G and 7B to the corresponding cathodes 6R, 6G and 6B of the CRT 4, respectively. These red, green and blue signals SR, SG and SB are also supplied to the color correction circuit 10. In this embodiment, the color correction circuit 10 is formed of white color and skin color detecting means 10A and 10B and a subtracter 14. In this case, a minimum value calculating circuit is used as the white color detecting means 10A, while the skin color detecting means 10B is formed of coefficient means 11R, 11G and 11B which are provided in the respective channels and a minimum value calculating circuit 12.

Figure 4:
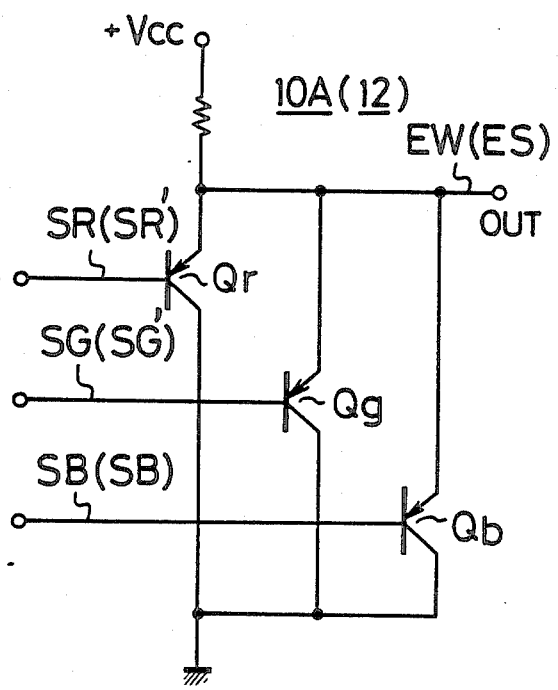
FIG. 4 is a connection diagram showing an example of a minimum value calculating circuit used in the color correction circuit shown in FIG. 3.

As shown in FIG. 4, the minimum value calculating circuit 10A (or 12) comprises PNP-type transistors Qr, Qg and Qb whose emitters and collectors are respectively connected common. The red, green and blue signals SR, SG and SB are respectively supplied to the bases of the transistors Qr, Qg and Qb and an output terminal OUT is led out from the common emitters thereof.

Of the transistors Qr, Qg and Qb, only one of them that is supplied with the signal of minimum level of the red, green and blue signals SR, SG and SB is turned on so that of the the red, green and blue signals SR, SG and SB, the signal of minimum level is developed at the output terminal OUT.

The respective coefficients $K_1$ to $K_3$ of the coefficient means 11R, 11G and 11B are respectively normalizing means that are determined in accordance with a particular color to be detected. They are selected such that when the particular color to be detected is supplied to the coefficient means 11R, 11G and 11B, the respective levels ER', EG' and EB' of the normalized red, green and blue signals SR', SG' and SB' become equal to each other and they are so normalized that the minimum value becomes 1, for simplicity. When the skin color is detected, if the ratios of the respective levels ER, EG and EB in the case of skin color are taken as KR, KG and KB, respectively and if the signal levels of the normalized red, green and blue signals SR', SG' and SB' are taken as ER', EG' and EB', respectively, the following equation is established.

$$ER':EG':EB' = \frac{KB}{KR} ER : \frac{KB}{KG} EG : \frac{KB}{KB} EB \quad (1)$$

$$= K_1 ER : K_2 EG : K_3 EB$$

where $$\left.\begin{array}{l} K_1 = \frac{KB}{KR} \\ K_2 = \frac{KB}{KG} \\ K_3 = \frac{KB}{KB} \end{array}\right\} \quad (2)$$

In the case of skin color, if yellow color skin is taken as a reference, the ratios are expressed as follows.

$$\left.\begin{array}{l} KR = 1.0 \\ KG = 0.85 \\ KB = 0.7 \end{array}\right\} \quad (3)$$

Therefore, the respective coefficients $K_1$ to $K_3$ of the coefficient means 11R to 11B are determined as follows.

$$\left.\begin{array}{l} K_1 = 0.7 \\ K_2 \approx 0.8 \\ K_3 = 1.0 \end{array}\right\} \quad (4)$$

If the red, green and blue signals SR, SG and SB with their levels ER, EG and EB as shown in FIGS. 5A to 5D are fed to the input terminals 2R, 2G and 2B, the following color detected outputs EW and ES are derived from the minimum value calculating circuits 10A and 12, respectively.

Figure 5A:
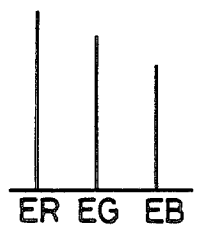
FIGS. 5A to 5L are respectively diagrams useful for explaining a skin color detecting operation.
Figure 5B:
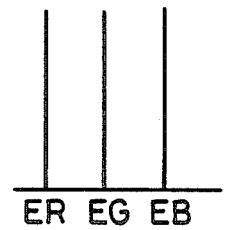
Figure 5C:
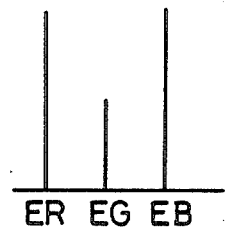
Figure 5D:
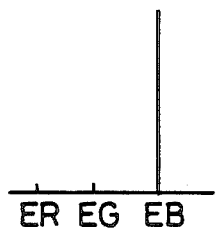

FIG. 5A shows the level relation (ER:EG:EB=1:0.85:0.7) upon the skin color, FIG. 5B shows the level relation (ER:EG:EB=1:1:1) upon the white color, FIG. 5C shows the level relation (ER=ER>EG in this embodiment) upon a desired color and FIG. 5D shows the level relation (ER=EG=0 and EB=1.0) when only the blue color component is supplied.

Figure 5E:
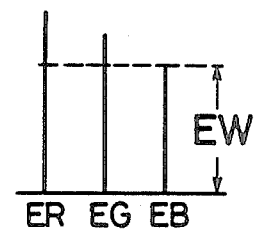
Figure 5F:
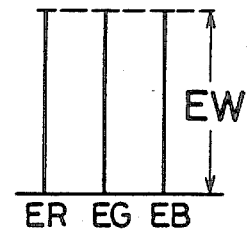
Figure 5G:
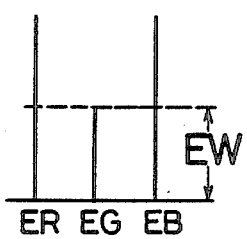

Since in the white color detecting means 10A, the respective channels are not provided with the coefficient means 11R, 11G and 11B unlike the skin color detecting means 10B, the coefficients of the respective channels are all 1. Accordingly, when the red, green and blue signals SR, SG and SB with the levels shown in FIGS. 5A to 5D are supplied to the white color detecting means 10A, the white color detecting means 10A produces the signals with the minimum level of the input signal levels ER, EG and EB as shown by broken lines in FIGS. 5E to 5H. In the case of FIG. 5A, the white color detecting means 10A produces the blue signal SB, which is then used as the white color detected output EW as shown in FIG. 5E. In the case of FIG. 5B the red, green and blue signals SR, SG and SB with the same level are supplied to the white color detecting means 10A so that the white color detecting means 10A produces any one (for example, the red signal SR) of them as shown in FIG. 5F.

Figure 5H:

In like manner, in the case of FIG. 5C, the green signal SG is produced (FIG. 5G) and in the case of FIG. 5D, the first color detected output EW becomes zero (FIG. 5H).

Figure 6A:
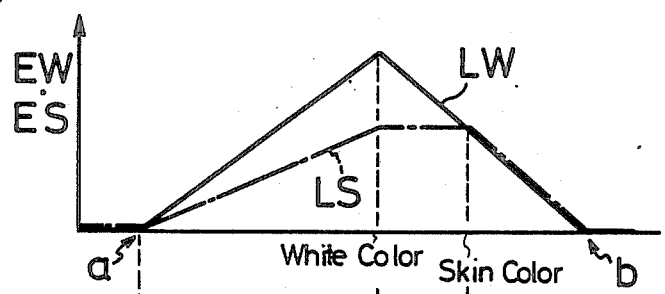
FIGS. 6A and 6B are respectively characteristic graphs of a skin color detecting output.

As will be clear from FIGS. 5E to 5H, the white color detecting means 10A produces an output whose output level is maximum in the case of white color, and which becomes slow when the signal containing a color component displaced from the white color is supplied thereto, and which becomes zero when the monochromatic signal whose saturation degree is 100% or a neutral color signal formed of two colors is supplied thereto. Accordingly, the white color detected output EW draws an output curve of triangular-waveform shown in a curve LW in FIG. 6A. In FIG. 6A, points a and b indicate the monochromatic color having a saturation degree of 100% or neutral color formed of two colors.

Figure 5I:
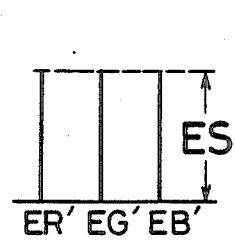
Figure 5J:
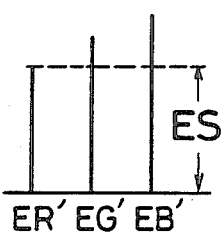
Figure 5K:
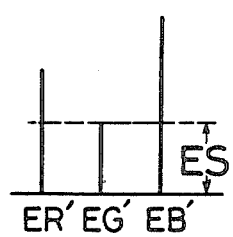
Figure 5L:
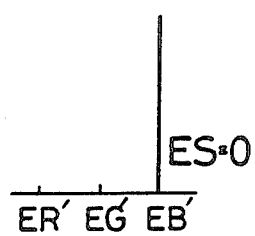

Whereas, since the skin color detecting means 10B is provided with the coefficient means 11R, 11G and 11B, even if the red, green and blue signals SR, SG and SB whose level relations are shown in FIGS. 5A to 5D are supplied thereto, the levels ER', EG' and EB' of the normalized signals SR', SG' and SB' derived therefrom become as shown in FIGS. 5I to 5L, respectively. In the case of skin color, the respective levels ER', EG' and EB' are made equal to one another by the normalization (FIG. 5I). In the case of white color, the levels ER', EG' and EB' become as shown in FIG. 5J, respectively so that the skin color detecting means 10B produces the normalized red signal SR'. When the color component signals as shown in FIGS. 5C and 5D are fed to the skin color detecting means 10B, the levels ER', EG' and EB' become as shown in FIGS. 5K and 5L, respectively.

In this case, the minimum values of the levels ER', EG' and EB' normalized in the case of skin color become equal to the level ER' provided in the case of white color. As the input color component is displaced from the white color and the skin color, the output level thereof becomes low and becomes zero in the case of the monochromatic color having the saturation of 100% or the two colors. Hence, the skin color detected output ES draws an output curve of trapezoid-shape shown by a curve LS in FIG. 6A.

Subsequently, since the skin color detected output ES is subtracted from the white color detected output EW in the subtracter 14, a subtracter output E0 becomes an output curve of triangular-shape shown by a curve L0 in FIG. 6B. More specifically, the level of the subtracted output E0 becomes maximum in the case of white color, becomes reduced as displaced from the white color, becomes zero in the case of skin color, similarly decreased as displaced from the white color to other color than the skin color and becomes zero at the point a in FIG. 6A.

As described above, the corrected output E0, which is the subtracted output, has such input and output characteristic that in the case of the white color input, the level thereof becomes maximum, while in the case of the skin color, it becomes zero.

The correction output E0 is supplied through volumes or variable resistors VR and VG for correcting R and G channels to adders 8R and 8G. Even when the same white signal is input, the output level of the correction output E0 is made different according to the input level thereof. Therefore, if the values of the variable resistors VR and VB are adjusted to be proper ones, when the white signal is supplied thereto, the correction output E0 is always subtracted from the signal levels of the R and G channels. In this case, therefore, only the blue signal SB is emphasized, whereby the white color looks beautiful in the visual sence.

On the other hand, when the input signal is the skin color signal, the correction output E0 becomes zero so that the red, green and blue signals SR, SG and SB are not corrected at all but the input levels themselves are produced and then fed to the cathode 6R, 6G and 6B of the CRT 4. There is then no defect that the skin color will be corrected to be a bluish skin color.

Figure 6B:
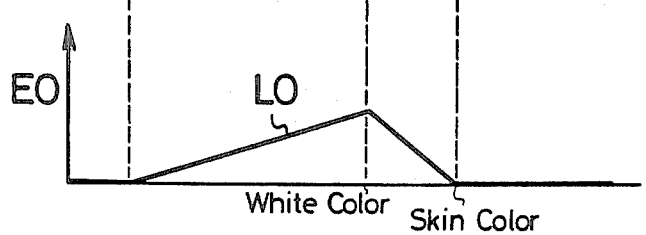

As will be clear from the characteristic curve in FIG. 6B, the level of correction output E0 is decreased with a predetermined inclination from the white color to the skin color. Therefore, when the picture of, for example, the same human face is displayed on the screen of the CRT 4, even if the luminance level becomes different and there is a portion with skin color near the white color, an unbalanced correction is not carried out in which the above-described portion becomes completely bluish and other portions are not corrected at all, because such color correction is carried out that the bluish color is gradually reduced in the portion of skin color that is close to the white color.

While in the first embodiment shown in FIG. 3, the red signal SR and the green signal SG are applied with the coefficients, in the practical television broadcasting there is a case where the skin color becomes rather pinkish Therefore, it may be possible that the blue signal SB may be emphasized by selecting the coefficient of the coefficient means 11G of the skin color detecting circuit 10B as 1 and the coefficient of the coefficient means 11B of the red signal SB as 0.7.

Figure 7:
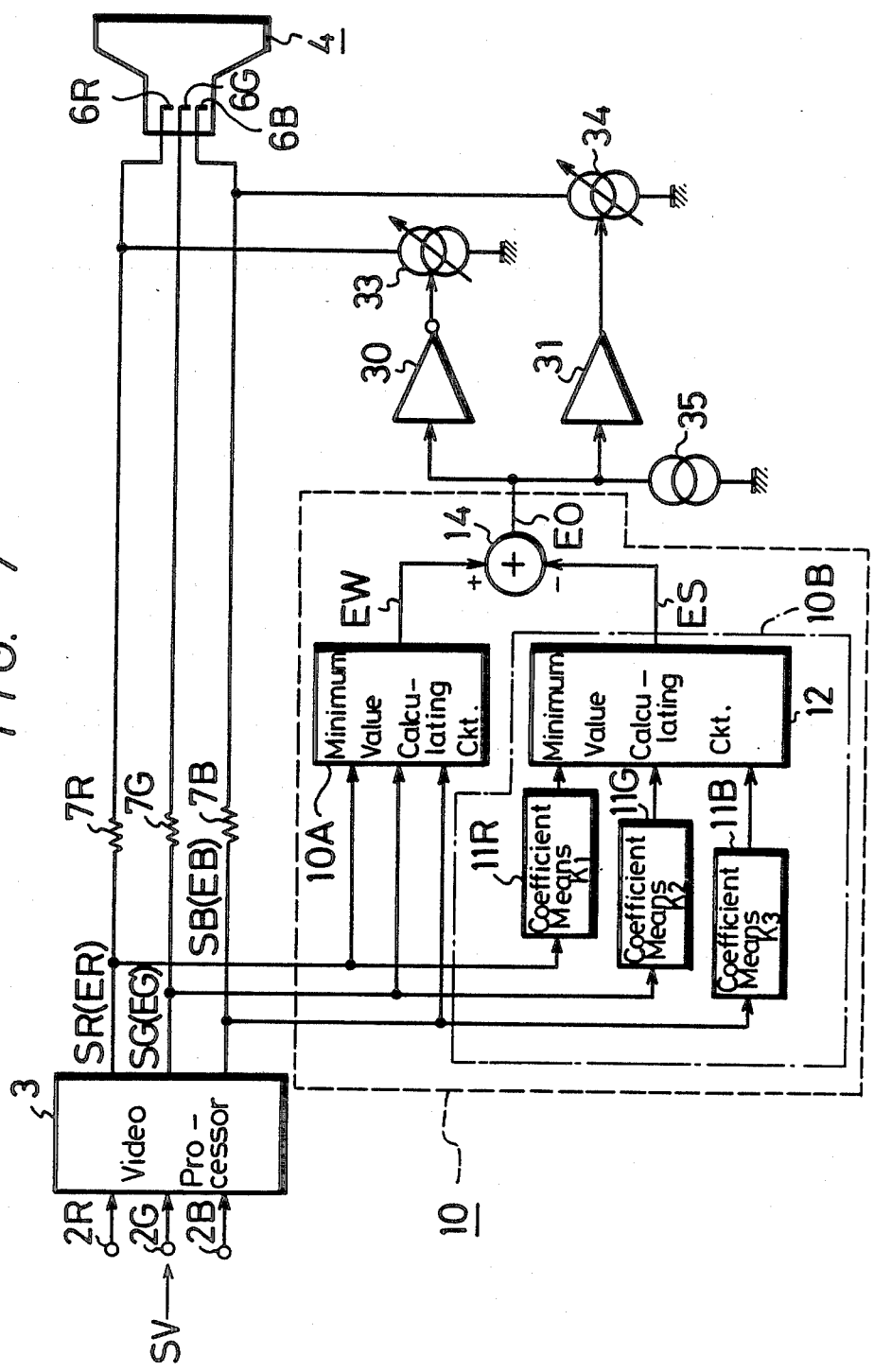
FIG. 7 is a block diagram showing a second embodiment of the color correction circuit according to this invention.

In this case, it is sufficient that as illustrated in a modified circuit arrangement of FIG. 3, which is the second embodiment of the color correction circuit according to this invention which is shown in FIG. 7, that the correction output E0 is phase-inverted by an inverter 30 and then added to the red signal SR and further, the correction output E0 is added to the blue signal SB via an amplifier 31.

In the second embodiment of FIG. 7, the levels of the red and blue signals SR and SB are corrected by current addition. In this case, referring to FIG. 7, there are respectively provided variable current sources 33 and 34 and a fixed current source 35, in which current subtraction is carried out by one variable current source 33, while current addition is carried out by another variable current source 34.

Figure 8:
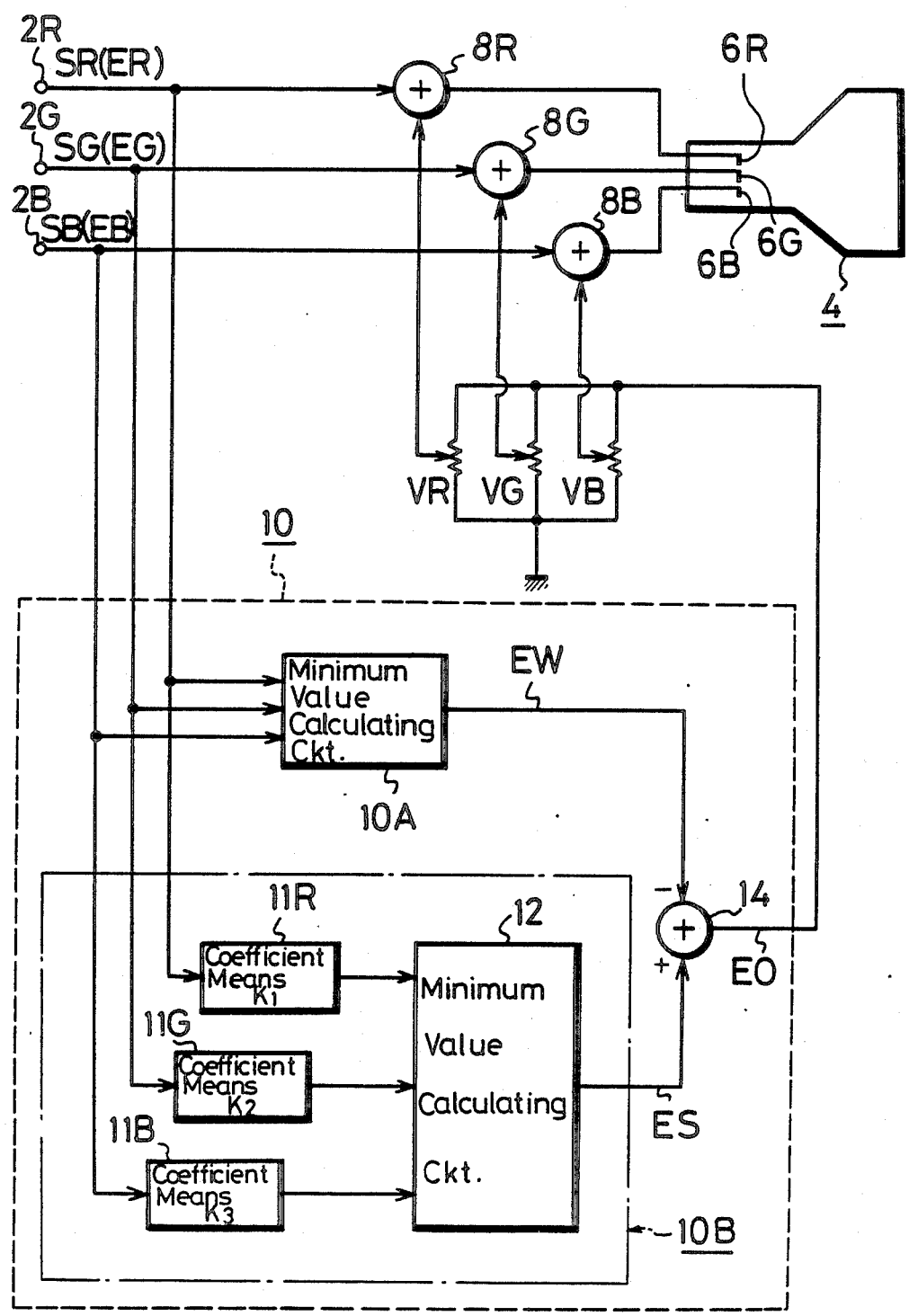
FIG. 8 is a block diagram showing a third embodiment of the color correction circuit according to this invention.

FIG. 8 is a block diagram showing a third embodiment of the color correction circuit according to this invention. The color correction circuit of this embodiment can correct only a particular color and can prevent other colors from being affected by such color correction. In FIG. 8, the circuit elements are substantially the same as those of FIG. 3 but the color correction circuit of the third embodiment differs therefrom in that the particular color detected output E0 from the subtracter 14 is supplied to three variable resistors VR, VG and VB and the outputs from the respective movable arms of the variable resistors VR, VG and VB are supplied to adders 8R, 8G and 8B, respectively. In this embodiment, when the coefficients $K_1$, $K_2$ and $K_3$ of the coefficient means 11R, 11G and 11B are the same as those of FIG. 3, the particular color detected output E0 becomes maximum only when the skin color signal is supplied thereto. Accordingly, when the skin color is corrected to be a little reddish skin color, if the G and B channel correction variable resistors VG and VB are adjusted to be minimum to thereby make the particular color detected output E0 which is applied to the adders 8G and 8B as zero and the R channel correction variable resistor VR is adjusted to thereby apply the level adjusted particular color detected output E0 to the adder 8R, the skin color is corrected to be skin color that is shifted to a more reddish skin color than the skin color at the image transmitting side.

At that time, when the red, green and blue signals SR, SG and SB except the signals which present the skin color are supplied to the color correction circuit the particular color detected output E0 shown in FIG. 6B is produced and the particular color detected output E0 is added to the R channel. At that time, however since the level of the particular color detected output E0 itself is small and such level is further adjusted by the variable resistor VR, even if the particular color detected output E0 is added to the R channel, it is possible to prevent all the colors except the skin color from being made reddish. In the case of the white color, the particular color detected output E0 becomes zero (E0 =0) so that the correction amount of the R channel becomes zero. Hence the white balance can be prevented from being disturbed.

When the skin color is corrected to be other desired skin colors, it is sufficient that the levels of the variable resistors VR, VG and VB are adjusted in accordance with the desired colors. For instance, if the output from the variable resistor VB is made zero and the outputs from the variable resistors VR and VG are selected to be proper values, it is possible to present the skin color to be a yellowish skin color.

When a particular color other than the skin color is changed to be a desired color, it may be enough that the coefficients $K_1$, $K_2$ and $K_3$ of the coefficient means 11R, 11G and 11B are changed and the particular color is detected by the detecting means 10B.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A color correction circuit comprising: three video signal lines for supplying red, green and blue signals, respectively; first means for generating a white color component from means for said red, green and blue signals which are supplied thereto by said three video signal lines; second means for generating a predetermined color component from at least two signals of said red, green and blue signals which are supplied thereto by at least two of said three video signal lines; means for producing a difference signal which is the difference between the output signals of said first and second detecting means; and means for controllng at least one of said red, green and blue signals according to said difference signal receiving the output of said means producing a difference signal.

2. A color correction circuit according to claim 1, in which said first detecting means is a circuit which produces a signal which corresponds to the lowest level of either of said red, green and blue signals.

3. A color correction circuit according to claim 1, in which said second detecting means is a circuit which produces a signal corresponding to an amplitude level of the lowest value of its input signals.

4. A color correction circuit according to claim 1, in which said second detecting means includes a circuit which adjusts each level of an input signal.

5. A color correction circuit according to claim 1, in which said second detecting means is a circuit which detects the color of skin.

6. A color correction circuit according to claim 1, in which said difference signal producing means is a subtraction circuit.

7. A color correction circuit according to claim 1, in which said controlling means includes an adder.

8. A color correction circuit according to claim 7, in which said adder functions to subtract a difference signal component.

* * * * *